US011935481B2

(12) United States Patent
Jo et al.

(10) Patent No.: US 11,935,481 B2
(45) Date of Patent: Mar. 19, 2024

(54) DISPLAY DEVICE

(71) Applicant: Samsung Display Co., Ltd., Yongin-si (KR)

(72) Inventors: Seung Han Jo, Seoul (KR); Min Chae Kwak, Seoul (KR); Kyeong Hwa Kim, Asan-si (KR); Mi Hae Kim, Asan-si (KR); Kyong Hwan Oh, Seoul (KR); Su Mi Jang, Asan-si (KR); Jae-Ho Choi, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/524,019

(22) Filed: Nov. 11, 2021

(65) Prior Publication Data

US 2022/0157245 A1 May 19, 2022

(30) Foreign Application Priority Data

Nov. 16, 2020 (KR) ........................ 10-2020-0152896

(51) Int. Cl.
*G09G 3/3258* (2016.01)

(52) U.S. Cl.
CPC ..... *G09G 3/3258* (2013.01); *G09G 2330/028* (2013.01)

(58) Field of Classification Search
CPC ... G09G 2300/0426; G09G 2300/0842; G09G 3/3233
See application file for complete search history.

(56) References Cited

U.S. PATENT DOCUMENTS

| | | | | |
|---|---|---|---|---|
| 10,026,799 | B2 * | 7/2018 | Jeong | G04G 9/022 |
| 2016/0035284 | A1 * | 2/2016 | Jung | G06F 1/163 345/82 |
| 2016/0232837 | A1 * | 8/2016 | Lee | G09G 3/3275 |
| 2016/0247452 | A1 * | 8/2016 | Lee | H10K 59/131 |
| 2016/0322445 | A1 * | 11/2016 | Lee | H10K 50/844 |
| 2019/0348491 | A1 * | 11/2019 | Chung | G09G 3/3266 |
| 2021/0202604 | A1 * | 7/2021 | Wu | H10K 59/1216 |
| 2021/0263554 | A1 * | 8/2021 | Park | G06F 1/1688 |
| 2022/0037451 | A1 * | 2/2022 | Kwak | H10K 59/65 |
| 2022/0352420 | A1 * | 11/2022 | Park | H01L 27/156 |

FOREIGN PATENT DOCUMENTS

| | | | |
|---|---|---|---|
| KR | 10-2017-0071816 | A | 6/2017 |
| KR | 10-2019-0030797 | A | 3/2019 |
| KR | 10-2019-0130092 | A | 11/2019 |
| KR | 10-2020-0074347 | A | 6/2020 |

* cited by examiner

*Primary Examiner* — Van N Chow
(74) *Attorney, Agent, or Firm* — Lewis Roca Rothgerber Christie LLP

(57) ABSTRACT

Provided is a display device, which includes: a reference voltage line formed along a circular outer line and configured to provide a reference voltage; a first reference voltage auxiliary line electrically connected to the reference voltage line and formed to be parallel with a predetermined interval; and a conductive line forming a contact with the reference voltage line and the first reference voltage auxiliary line and configured to provide the reference voltage to a cathode.

16 Claims, 9 Drawing Sheets

DISPLAY DEVICE

CROSS-REFERENCE TO RELATED APPLICATION

The present application claims priority to and the benefit of Korean Patent Application No. 10-2020-0152896 filed in the Korean Intellectual Property Office on Nov. 16, 2020, the entire content of which is incorporated herein by reference.

BACKGROUND

1. Field

Aspects of some embodiments of the present invention relate to a display device.

2. Description of the Related Art

As the field of display devices that visually express various electrical signal information has developed rapidly, various display devices with excellent characteristics such as thinner, lighter, low power consumption, etc. are being researched and developed. Of these, an organic light emitting diode display, which is a self-luminous display device, does not require a separate light source, so it may be driven at a relatively low voltage and may be configured as a relatively lightweight and thin display device, and has high quality characteristics such as a relatively wide viewing angle, high contrast, and fast response speed, and as a result, it is attracting attention as a next-generation display device.

The organic light emitting diode display includes a display panel having a display area in which pixels displaying images are provided, and a non-display area that does not display images by being located on the outside of the display area. Each of the pixels is driven by a scan signal and emits light with a brightness corresponding to a magnitude of a data voltage. A voltage drop (or an IR Drop) may occur in a power line supplying power to the pixels, which may cause an image quality deterioration of the display device.

The above information disclosed in this Background section is only for enhancement of understanding of the background and therefore the information discussed in this Background section does not necessarily constitute prior art.

SUMMARY

Aspects of some embodiments include a display device capable of improving a difference in luminance depending on a voltage drop.

According to some embodiments, a display device may include: a reference voltage line formed along a circular outer line and providing a reference voltage; a first reference voltage auxiliary line electrically connected to the reference voltage line and formed to be parallel with a predetermined interval; and a conductive line forming a contact with the reference voltage line and the first reference voltage auxiliary line and providing the reference voltage to a cathode.

According to some embodiments, the first direction may be a Y-axis direction, and the second direction may be an X-axis direction.

According to some embodiments, the first direction may be an X-axis direction, and the second direction may be a Y-axis direction.

According to some embodiments, the display device may further include a second reference voltage auxiliary line electrically connected to the reference voltage line and the first reference voltage auxiliary line, extending in the second direction, and formed to be parallel in the first direction with a predetermined interval.

According to some embodiments, the conductive line may form the contact with the reference voltage line and the first reference voltage auxiliary line or the second reference voltage auxiliary line to provide the reference voltage to the cathode.

According to some embodiments, the display device may further include a metal line electrically connecting the reference voltage line and the first reference voltage auxiliary line.

According to some embodiments, the metal line may include a first metal line, a second metal line and an insulated line formed between the first metal line and the second metal line.

According to some embodiments, the first reference voltage auxiliary line may be formed to overlap the driver area or the pixel area.

According to some embodiments, at least a part of the first reference voltage auxiliary line may provide the reference voltage to the pixel area.

According to some embodiments, the first direction may be a direction forming an acute angle based on the X-axis and the second direction may be a direction forming an acute angle based on the Y-axis.

According to some embodiments, a display device may include: a display area and a non-display area, wherein the non-display area may include a reference voltage line providing a reference voltage; a first reference voltage auxiliary line and a second reference voltage auxiliary line formed to be separated from the reference voltage line and located in the non-display area to provide the reference voltage; and a conductive line forming a contact for upper surfaces of the reference voltage line, the first reference voltage auxiliary line, and the second reference voltage auxiliary line to provide the reference voltage to a cathode.

According to some embodiments, the first reference voltage auxiliary line may be formed to overlap the driver area or the pixel area.

According to some embodiments, at least a part of the first reference voltage auxiliary line may provide the reference voltage to the pixel area.

According to some embodiments, the display device may further include a metal line forming the contact for lower surfaces of the reference voltage line and first reference voltage auxiliary line.

According to some embodiments, the metal line may include a first metal line, a second metal line and an insulating line between the first metal line and the second metal line.

According to some embodiments, the reference voltage line may be formed circularly along the circular outer line.

According to some embodiments, the reference voltage line may be substantially formed quadrangle shape.

According to some embodiments, a display device may include: a reference voltage line formed in a quadrangle shape to provide a reference voltage; a first reference voltage auxiliary line electrically connected to the reference voltage line, extending in a first direction, and formed to be parallel with a predetermined interval in a second direction perpendicular to the first direction; and a second reference voltage auxiliary line electrically connected to the reference voltage line and the first reference voltage auxiliary line, extending in the second direction, and formed to be parallel in the first direction with a predetermined interval.

According to some embodiments, the display device may further include a conductive line forming the contact for the reference voltage line with the first reference voltage auxiliary line or the second reference voltage auxiliary line to provide the reference voltage to the cathode.

According to some embodiments, the display device may further include a metal line electrically connecting the reference voltage line and the first reference voltage auxiliary line or the second reference voltage auxiliary line.

According to some embodiments, by forming the reference voltage auxiliary line, the area of the contact formed between the reference voltage line providing the reference voltage ELVSS and the conductive line providing the reference voltage ELVSS to the cathode is increased, thereby a luminance difference due to voltage drop may be improved.

In addition, by lowering the resistance through the metal line electrically connected to the reference voltage line and the reference voltage auxiliary line, the luminance difference due to the voltage drop may be improved. Furthermore, by forming the reference voltage auxiliary line, the space of the reference voltage ELVSS may be expanded on the driver area and the pixel area of the panel.

DETAILED DESCRIPTION

Figure 1:
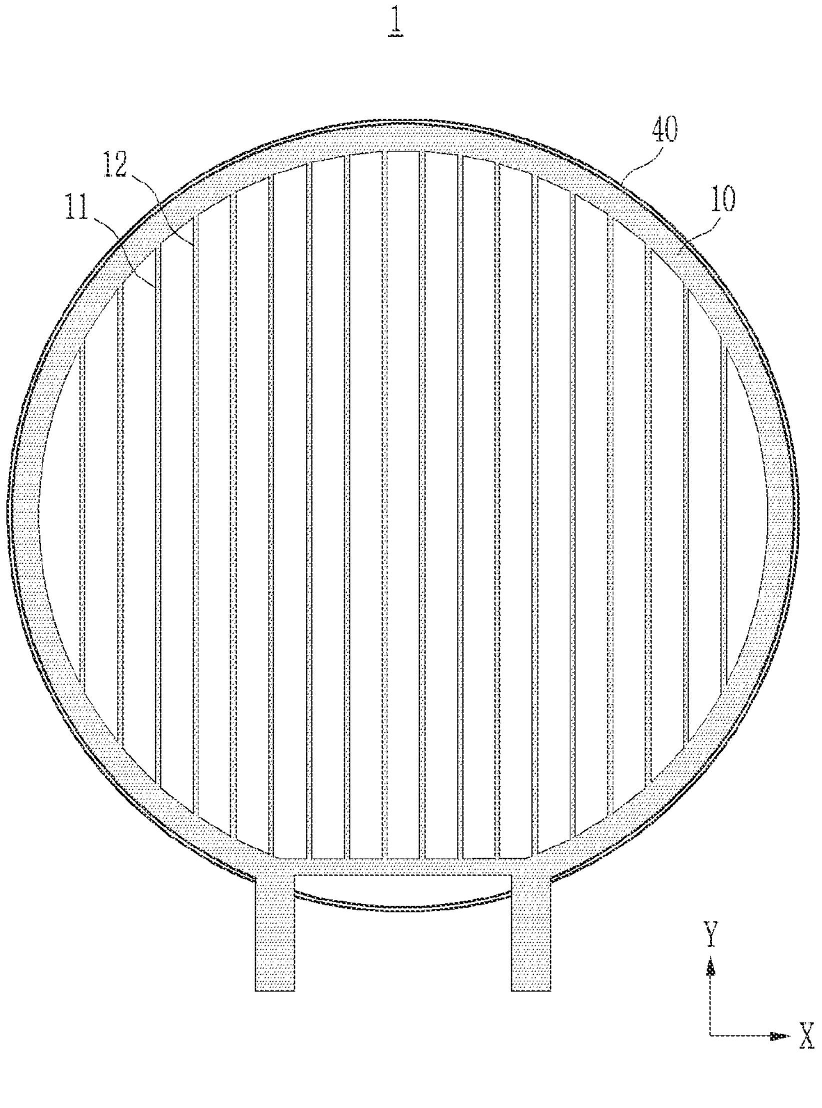
FIG. 1 is a view for explaining a circular display device according to some embodiments of the present invention.

Hereinafter, aspects of some embodiments of the present invention will be described in more detail with reference to the accompanying drawings so that those skilled in the art may more easily practice the present invention. As those skilled in the art would realize, the described embodiments may be modified in various different ways, all without departing from the spirit or scope of the present invention.

In describing aspects of some embodiments of the present invention, components or elements that are not necessary to describe in order to enable a person having ordinary skill in the art to make, use, and understand embodiments according to the description may be omitted. Like reference numerals generally designate like elements throughout the specification.

In addition, the size and thickness of each configuration shown in the drawings are arbitrarily shown for better understanding and ease of description, but the present invention is not limited thereto. In the drawings, the thickness of layers, films, panels, areas, etc., are exaggerated for clarity. In the drawings, for better understanding and ease of description, the thicknesses of some layers and areas are exaggerated.

It will be understood that when an element such as a layer, film, area, or substrate is referred to as being "on" another element, it can be directly on the other element or intervening elements may also be present. In contrast, when an element is referred to as being "directly on" another element, there are no intervening elements present. Further, the word "on" or "above" means positioned on or below the object portion, and does not necessarily mean positioned on the upper side of the object portion based on a gravitational direction.

In addition, unless explicitly described to the contrary, the word "comprise", and variations such as "comprises" or "comprising", will be understood to imply the inclusion of stated elements but not the exclusion of any other elements.

Further, in the specification, the phrase "in a plan view" means when an object portion is viewed from above, and the phrase "in a cross-sectional view" means when a cross-section taken by vertically cutting an object portion is viewed from the side.

In addition, unless explicitly described, the "X-axis direction" and "Y-axis direction" used herein refer to two directions perpendicular to each other in a rectangular coordinate system. Wherein, "Y-axis direction" may be a direction parallel to axis of symmetry of display device, and "X-axis direction" may be a direction perpendicular to axis of symmetry of display device.

FIG. 1 is a view for explaining a circular display device according to some embodiments of the present invention.

Referring to FIG. 1, a circular display device 1 according to some embodiments of the present invention may include a circular outer line 40 and a reference voltage line 10 formed along the outer line 40 and providing a reference voltage ELVSS.

The circular display device 1 may include a circular touch panel and a circular display panel, and the circular touch panel and the circular display panel may be formed separately, or may be integrally formed in an on-cell or in-cell method.

The circular display device 1 may have a display area at which images are displayed within the outer line 40 and a non-display area positioned around the display area. A plurality of pixels are formed in the display area, and a plurality of pixels may include an organic light emitting element. The non-display area includes a pad area and a driver area, which are areas to which various electronic elements or printed circuit boards (PCBs) are electrically attached, and a reference voltage line 10 and a driving voltage line supplying power to drive the display device 1 may be positioned. Here, the reference voltage line 10 may provide a reference voltage ELVSS (e.g., a low voltage or ground) applied to a cathode of a light-emitting element (referring to 330 of FIG. 5) included in a plurality of pixels formed in the display area, respectively, and the driving voltage line may provide a driving voltage ELVDD (e.g., a high voltage) to the pixels in the display area.

The circular display device 1 may include reference voltage auxiliary lines 11 and 12. The reference voltage auxiliary lines 11 and 12 may be formed to be electrically connected to the reference voltage line 10 to provide a reference voltage ELVSS. A plurality of reference voltage auxiliary lines 11 and 12 may be formed, and a plurality of reference voltage auxiliary lines 11 and 12 may be respectively arranged to be parallel with each other at an interval (e.g., a set or predetermined interval). In this case, the intervals between a plurality of reference voltage auxiliary lines 11 and 12 may be designed to be the same, although according to some embodiments, at least some intervals may be designed to be different from other intervals. Meanwhile, a plurality of reference voltage auxiliary lines 11 and 12 may have a width (e.g., a set or predetermined width), and the widths of a plurality of reference voltage auxiliary lines 11 and 12 may all be designed to be the same, and differently, at least some widths may be designed to be different from other widths.

Figure 2:
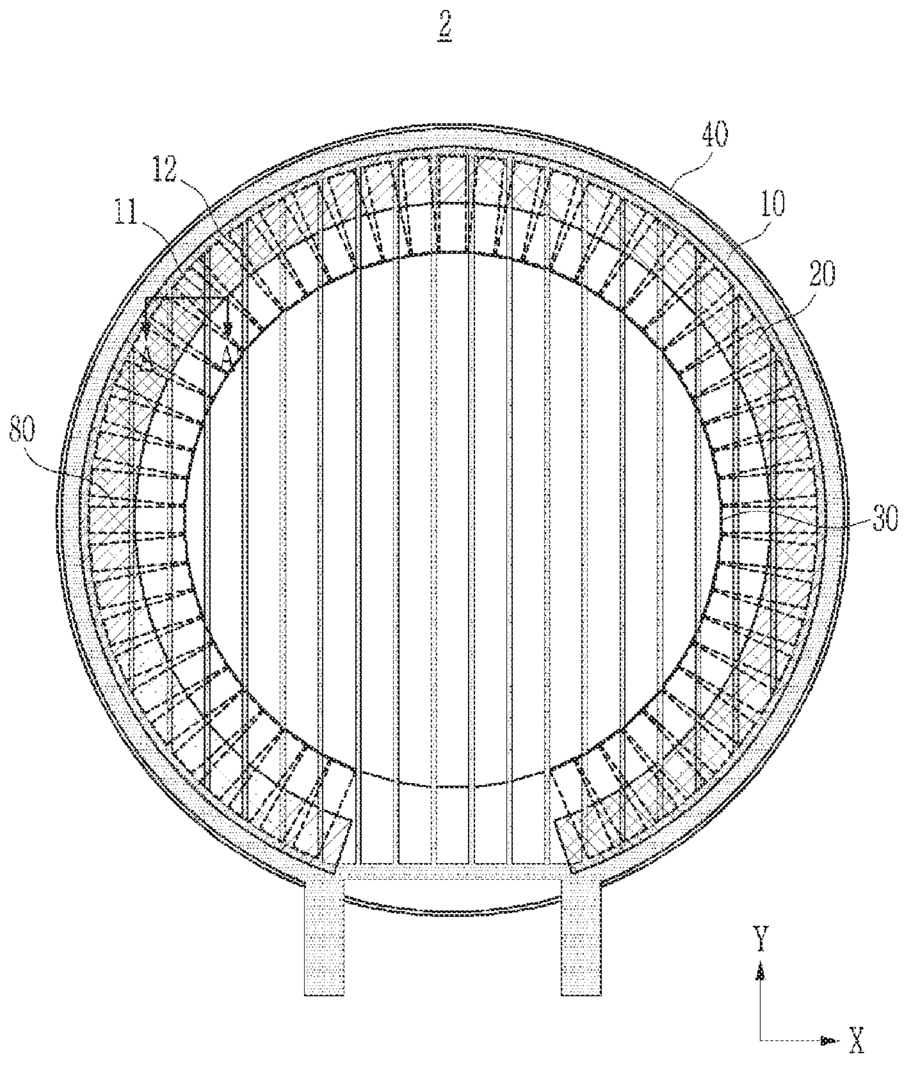
FIG. 2 is a view for explaining a circular display device according to some embodiments of the present invention.

FIG. 2 is a view for explaining a circular display device according to some embodiments of the present invention.

Referring to FIG. 2, the circular display device 2 according to some embodiments of the present invention may include the reference voltage line 10 described in FIG. 1, a conductive line 20 for forming a contact with the reference voltage line 10, and an active line 30. The pixel may be positioned inside the active line 30, and the inside of the active line 30 constitutes the display area. The outside of the active line 30 constitutes a non-display area, and a driver area 80 is formed therein. Thus, according to some embodiments, the active line 30 may serve as a border between the display area and the non-display area.

The conductive line 20 may also be circularly formed along the reference voltage line 10 formed circularly along the circular outer line 40. The conductive line 20 may form an electrical connection between the reference voltage line 10 and the cathode of the pixel, thereby providing the reference voltage ELVSS of the reference voltage line 10 to the cathode. That is, the conductive line 20 is connected to the reference voltage line 10 through the opening and may be electrically extended to the cathode of the pixel. According to some embodiments, the conductive line 20 may be formed on the same layer as the anode of the pixel, and may be formed in the same process and of the same material as the anode. Meanwhile, the reference voltage line 10 may be formed on the same layer as the source/drain metal layer (referring to FIG. 5) of the pixel, and may be formed in the same process and of the same material as the source/drain metal layer.

As shown in FIGS. 1 and 2, the circular display device 1 or 2 may include the reference voltage auxiliary lines 11 and 12. The reference voltage auxiliary lines 11 and 12 may be formed to be extended in a first direction (a Y-axis direction). A plurality of reference voltage auxiliary lines 11 and 12 may be formed, and a plurality of reference voltage auxiliary lines 11 and 12 may be respectively formed to be parallel in a second direction (an X-axis direction) with an interval (e.g., a set or predetermined interval). In this case, the intervals between a plurality of reference voltage auxiliary lines 11 and 12 may be all designed to be the same, and differently, at least some intervals may be designed to be different from other intervals.

The conductive line 20 may also form the contact with the reference voltage auxiliary lines 11 and 12. That is, the conductive line 20 forms the contact with the reference voltage line 10 and the reference voltage auxiliary lines 11 and 12, so that an effect of increasing the area of the contact formed between the reference voltage line 10 and the conductive line 20 may occur, and accordingly, the luminance difference due to the voltage drop may be improved.

On the other hand, the reference voltage auxiliary lines 11 and 12 are formed on the driver area and the pixel area of the panel and are electrically connected to the elements formed in the driver area and the pixel area, thereby enlarging the space for the reference voltage ELVSS on the driver area and the pixel area. For example, the reference voltage auxiliary lines 11 and 12 may be formed on the driver area 80 as shown in FIG. 2. FIG. 2 shows the structure in which the driver area 80 is formed along the outer part except for some areas. According to some embodiments, the driver area 80 may be formed as a whole, and also, unlike FIG. 2, the driver area 80 may not be formed in other parts.

Figure 3:
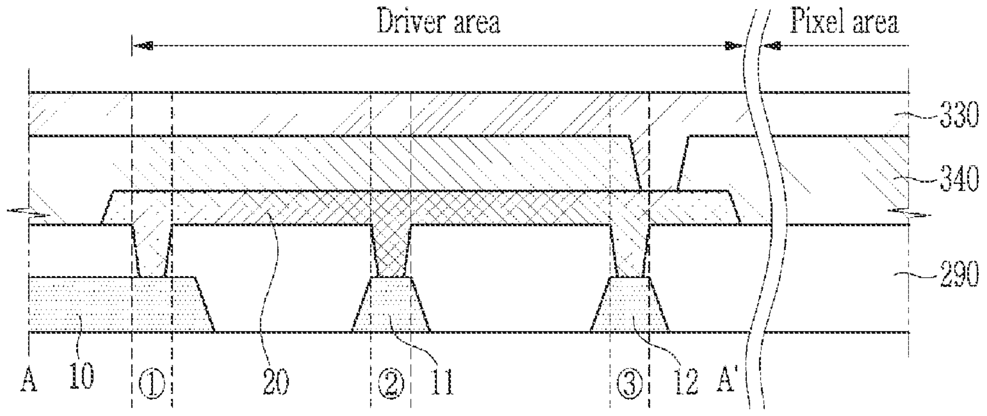
FIG. 3 is a view for explaining an example of a partial cross-section taken along a line AA' in FIG. 2 in a display device according to some embodiments.

FIG. 3 is a view for explaining an example of a partial cross-section taken along a line AA' in FIG. 2 in a display device according to some embodiments.

In FIG. 3, some layers are omitted and the structure in which the conductive layers are connected is mainly shown. FIG. 3 is the enlarged view based on the driver area 80 of FIG. 2.

Referring to FIG. 3, in the cross-section, the display device 2 may include the reference voltage line 10, the reference voltage auxiliary lines 11 and 12, and the conductive line 20, which provide the reference voltage ELVSS. A planarization layer 290 may be positioned between the reference voltage line 10 and the conductive line 20, and between the reference voltage auxiliary lines 11 and 12 and the conductive line 20. The reference voltage auxiliary lines 11 and 12 are formed to be separated from the reference voltage line 10 and may provide the reference voltage ELVSS, and the conductive line 20 forms the contact for upper surfaces of the reference voltage line 10 and the reference voltage auxiliary lines 11 and 12 to transmit the reference voltage ELVSS and may finally extend to provide the reference voltage ELVSS to the cathode 330 of the pixel. Here, the reference voltage line 10 and the reference voltage auxiliary lines 11 and 12 may be the same layer as the source/drain metal layer of the pixel, and the conductive line 20 may be the same layer as the anode of the pixel. According to some embodiments as illustrated in FIG. 3, the reference voltage ELVSS is electrically connected to the cathode 330 formed on the pixel definition layer 340, and the conductive line 20 and the cathode 330 are electrically connected in the driver area, thereby the reference voltage ELVSS may be finally transmitted to the cathode 330.

According to some embodiments, at least a part of the upper surface of the reference voltage line 10 and the conductive line 20 form the contact in the area represented by ①, the upper surface of the reference voltage auxiliary line 11 (first ELVSS Bus wiring) and the conductive line 20 form the contact in the area represent by ②, and the upper surface of the reference voltage auxiliary line 12 (second ELVSS Bus wiring) and the conductive line 20 form the contact in the area represented by ③.

According to some embodiments, the area represented by ① may be defined by the reference voltage line 10 and a partial region of the driver area (a left area), the area represented by ② may be defined between the partial area of the driver area (a left area) and the other partial area of the driver area (a right area), and the area represented by ③ may be defined between the other partial area of the driver area (a right area) and the pixel area, and for example, the driver area may correspond to the driver area 80 of FIG. 2.

In other words, the reference voltage auxiliary lines 11 and 12 may be formed to overlap the driver area or the pixel area.

According to some embodiments, the reference voltage auxiliary line 11 and the reference voltage auxiliary line 12 may be formed with the same width or different widths. Meanwhile, the interval between the reference voltage auxiliary line 11 and the reference voltage auxiliary line 12 may be formed to be the same as the interval between the reference voltage auxiliary line 12 and an additional reference voltage auxiliary line to be formed on the pixel area into the right of the reference voltage auxiliary line 12 or may be formed to be different.

According to some embodiments, as the conductive line 20 forms the contact for the upper surfaces of the reference voltage auxiliary lines 11 and 12 in addition to the reference voltage line 10, an effect of increasing the area of the contact formed between the reference voltage line 10 and the conductive line 20 may occur, and accordingly, the luminance difference due to the voltage drop may be improved.

In addition, because the reference voltage ELVSS is connected in areas other than the reference voltage line 10 through the reference voltage auxiliary lines 11 and 12, the space for the reference voltage ELVSS may be expanded on the driver area and/or the pixel area.

Figure 4:
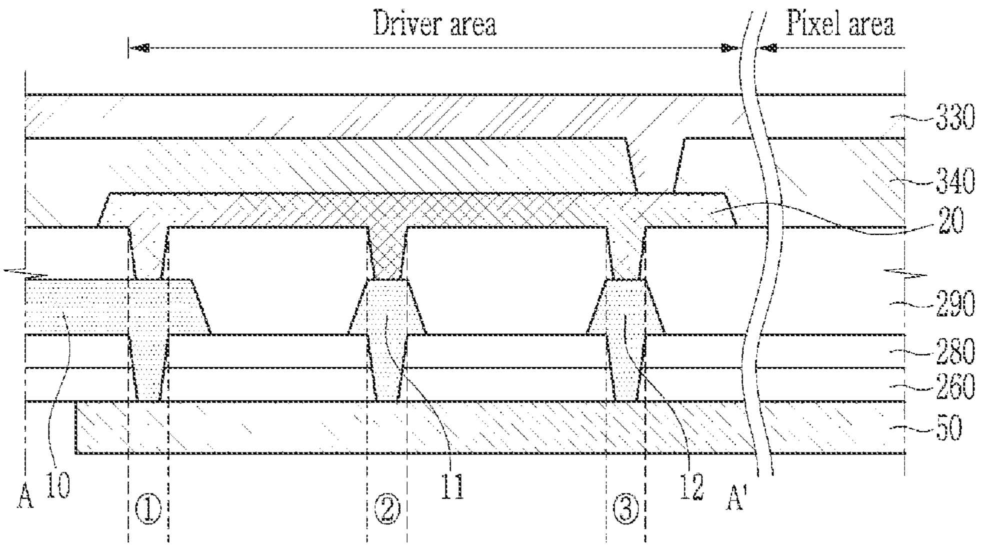
FIG. 4 is a view for explaining an example of a partial cross-section taken along a line AA' in FIG. 2 in a display device according to some embodiments.

FIG. 4 is a view for explaining an example of a partial cross-section taken along a line AA' in FIG. 2 in a display device according to some embodiments. The description of the constituent elements that are the same as the above-described constituent elements is omitted.

Also, in FIG. 4, some layers are omitted and the structure in which the conductive layers are connected is mainly shown.

Referring to FIG. 4, in the cross-section, the display device 2 may include a reference voltage line 10, reference voltage auxiliary lines 11 and 12, a conductive line 20, and a metal line 50, which provide the reference voltage ELVSS. The reference voltage auxiliary lines 11 and 12 may be formed to be separated from the reference voltage line 10 to provide the reference voltage ELVSS, and the conductive line 20 may form the contact for upper surfaces of the reference voltage line 10 and the reference voltage auxiliary lines 11 and 12 to provide the reference voltage ELVSS to the cathode. A planarization layer 290 may be positioned between the reference voltage line 10 and the reference voltage auxiliary lines 11 and 12, and the conductive line 20. That is, according to some embodiments as illustrated in FIG. 4, the reference voltage ELVSS is electrically connected to the cathode 330 formed on the pixel definition layer 340, and the conductive line 20 and the cathode 330 are electrically connected in the driver area, thereby the reference voltage ELVSS may be finally transmitted to the cathode 330. The embodiments described with respect to FIG. 4 may further include the additional metal line 50, unlike FIG. 3.

The metal line 50 may electrically connect the reference voltage line 10 and the reference voltage auxiliary lines 11 and 12. The first interlayer insulating layer 260 and the second interlayer insulating layer 280 may be positioned between the metal line 50 and the reference voltage line 10, and between the metal line 50 and the reference voltage auxiliary lines 11 and 12, and one of them may be omitted. The metal line 50 may be connected to the reference voltage line 10, may be formed on the same layer as the gate metal layer (referring to FIG. 5) of the pixel, and may be formed of the same material in the same process as the gate metal layer. Here, the metal line 50 may be connected to the reference voltage line 10 through a contact hole formed in an inorganic film, for example, but the range of the present invention is not limited thereto. For example, the metal line 50 may be connected to an intermediate metal layer 270 of FIG. 5. The voltage drop due to the resistance may be reduced by increasing the wiring to which the reference voltage ELVSS is applied by the metal line 50.

According to some embodiments, in the area represented by ① at least a part of the upper surface of the reference voltage line 10 and the conductive line 20 may form the contact and at least a part of the lower surface of the reference voltage line 10 and the metal line 50 may form the contact, in the area represent by ② the upper surface of the reference voltage auxiliary line 11 (first ELVSS Bus wiring) and the conductive line 20 may form the contact and the lower surface of the reference voltage auxiliary line 11 (first ELVSS Bus wiring) and the metal line 50 may form the contact, and in the area represented by ③ the upper surface of the reference voltage auxiliary line 12 (second ELVSS Bus wiring) and the conductive line 20 may form the contact and the lower surface of the reference voltage auxiliary line 12 (second ELVSS Bus wiring) and the metal line 50 may form the contact.

According to some embodiments, as the conductive line 20 forms the contact for the upper surface of the reference voltage auxiliary lines 11 and 12 in addition to the reference voltage line 10, an effect of increasing the area of the contact formed between the reference voltage line 10 and the conductive line 20 may occur, and accordingly, the luminance difference due to the voltage drop may be improved.

In addition, as the reference voltage auxiliary lines 11 and 12 are formed to overlap the driver area or the pixel area, the resistance may be reduced by providing the reference voltage ELVSS in the pixel area, and the space in which the reference voltage ELVSS is formed may be expanded. That is, as the metal line 50 electrically connects the reference voltage line 10 and the reference voltage auxiliary lines 11 and 12, the resistance may be reduced, thereby reducing the luminance difference due to the voltage drop.

Figure 5:
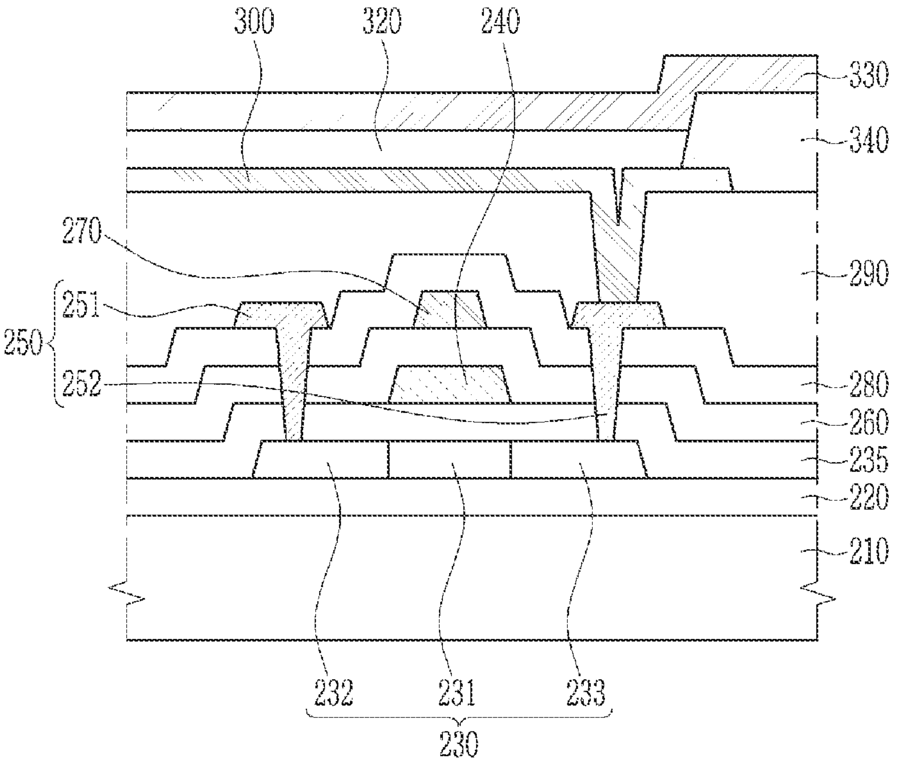
FIG. 5 is a view for explaining a pixel of a display device according to some embodiments of the present invention.

FIG. 5 is a view for explaining a pixel of a display device according to embodiments of the present invention.

Referring to FIG. 5, the pixel of the display device according to embodiments of the present invention may include, for example, a base layer 210, a buffer layer 220, a semiconductor layer 230, a gate insulating layer 235, a gate metal layer 240, a source/drain metal layer 250, a first interlayer insulating layer 260, an intermediate metal layer 270, a second interlayer insulating layer 280, a planarization layer 290, an anode 300, an emission layer 320, a cathode 330, and a pixel definition layer 340. Of course, the structure shown in FIG. 5 is only an example in which the pixel may be implemented, and the pixel of the display device according to some embodiments of the present invention may be implemented in a structure different from that shown.

The base layer 210 may form a lowest layer of an organic light emitting diode display. The base layer 210 may support circuit elements and wirings that make up a circuit part provided upward. Alternatively, the base layer 210 may be formed of a flexible plastic, so that the organic light emitting diode display is flexible.

The buffer layer 220 may cover the upper part of the base layer 210. The buffer layer 220 may be formed of an excellent insulating material. The buffer layer 220 may protect the circuit elements and wirings that make up the circuit part provided on the base layer 210 from external impact or static electricity. According to some embodiments, a glass substrate may be used without using a flexible substrate, and thus a glass substrate may be included instead of the base layer 210 and the buffer layer 220.

The semiconductor layer 230 may be located on the buffer layer 220. The semiconductor layer 230 may be formed of a semiconductor in which a portion of the area is doped or plasma-treated to form a conductor. The semiconductor layer 230 may form a channel of a thin film transistor constituting the pixel. The semiconductor layer 230 may include a channel area 231, a first area 232, and a second area 233. The channel area 231 may be an area for forming the channel of the gate electrode of the thin film transistor. The first area 232 and the second area 233 may be areas for forming the channel of the source electrode and the drain electrode of the thin film transistor. Here, as the semiconductor layer, a polycrystalline semiconductor layer, an oxide semiconductor layer, and an amorphous semiconductor layer may be used.

The gate insulating layer 235 may be located on the buffer layer 220 and the semiconductor layer 230. The gate insulating layer 235 may cover the buffer layer 220 and the semiconductor layer 230 as a whole. The gate insulating layer 235 may be formed of an excellent insulating material. The gate insulating layer 235 may prevent the semiconductor layer 230 from being short-circuited to the gate metal layer 240 and distinguish the channel of the thin film transistor formed by the semiconductor layer 230. The gate insulating layer 235 may be formed of an inorganic insulating material.

The gate metal layer 240 may be located on the gate insulating layer 235. The gate metal layer 240 may be a gate metal layer for forming the gate electrode of the thin film transistor and a gate line. The gate metal layer 240 may be formed of an metal or alloys with an excellent electric conductivity, may include molybdenum (Mo), aluminum (Al), copper (Cu), and/or titanium (Ti), and may be a single layer or a multi-layered structure of the material.

The first interlayer insulating layer 260 may be located on the gate metal layer 240 and the gate insulating layer 235. The first interlayer insulating layer 260 may be formed of a material having excellent electrical insulating properties and may be formed of an inorganic insulating material.

The intermediated metal layer 270 may be located on the first interlayer insulating layer 260. The intermediate metal layer 270 may be arranged to overlap the gate metal layer 240 for forming the gate electrode of the thin film transistor among the gate metal layer 240. The intermediated metal layer 270 may form a mutual capacitance with the gate metal layer 240 that forms the gate electrode of the thin film transistor. The intermediated metal layer 270 may perform a function of an electrode on one side of a storage capacitor, may include molybdenum (Mo), aluminum (Al), copper (Cu), and/or titanium (Ti), and may be a single layered or multi-layered structure.

The second interlayer insulating layer 280 may be located on the first interlayer insulating layer 260 and the intermediate metal layer 270. The second interlayer insulating layer 280 may be formed of a material having excellent electrical insulating properties, and may be formed of an inorganic insulating material or an organic insulating material.

The source/drain metal layer 250 may be located on the second interlayer insulating layer 280. The source/drain metal layer 250 may form a first electrode 251 and a second electrode 252 of the thin film transistor forming the pixel. The source/drain metal layer 250 may be a source/drain metal layer located on the gate metal layer 240. The source/drain metal layer 250 may be formed of a metal or alloy with excellent electric conductivity, including aluminum (Al), platinum (Pt), palladium (Pd), silver (Ag), magnesium (Mg), gold (Au), nickel (Ni), neodymium (Nd), iridium (Ir), chromium (Cr), nickel (Ni), calcium (Ca), molybdenum (Mo), titanium (Ti), tungsten (W), and/or copper (Cu), etc., and may be a single layer or multi-layered structure of the material.

The planarization layer 290 may be located on the second interlayer insulating layer 280 and the source/drain metal layer 250. The planarization layer 290 may reduce a height difference of the upper surface. Accordingly, the planarization layer 290 may prevent a deviation that occurs depending on an area in a height relative to the base layer 210. The planarization layer 290 may be formed of an organic material.

The anode 300 may be located on the planarization layer 290. The anode 300 may be connected to the second electrode 252 of the thin film transistor that makes up the pixel. The anode 300 may be classified for each pixel. The anodes 300 adjacent to each other may be electrically insulated due to the pixel definition layer 340.

The emission layer 320 may be provided on the anode 300. The emission layer 320 may include a hole transporting layer, an organic light emitting layer, and an electron transporting layer. In the emission layer 320, when voltages are applied to the anode 300 and the cathode 330, holes and electrons are transferred to the organic light emitting layer through the hole transporting layer and the electron transporting layer, respectively, and are combined with each other in the organic light emitting layer to emit light.

The cathode 330 may be provided on the emission layer 320 and the pixel definition layer 340. The cathode 330 may provide the reference voltage ELVSS.

The pixel definition layer 340 may be provided between the anode 300, by including an opening that exposes the anode 300 of the pixels. The pixel definition layer 340 may partition a light emitting diode (LED) portion of the pixel. The pixel definition layer 340 may be formed of an organic material.

The conductive line 20 according to the embodiments of the present invention forms the electrical connection between the reference voltage line 10 and the cathode 330, thereby providing the reference voltage ELVSS of the reference voltage line 10 to the cathode 330.

Figure 6:
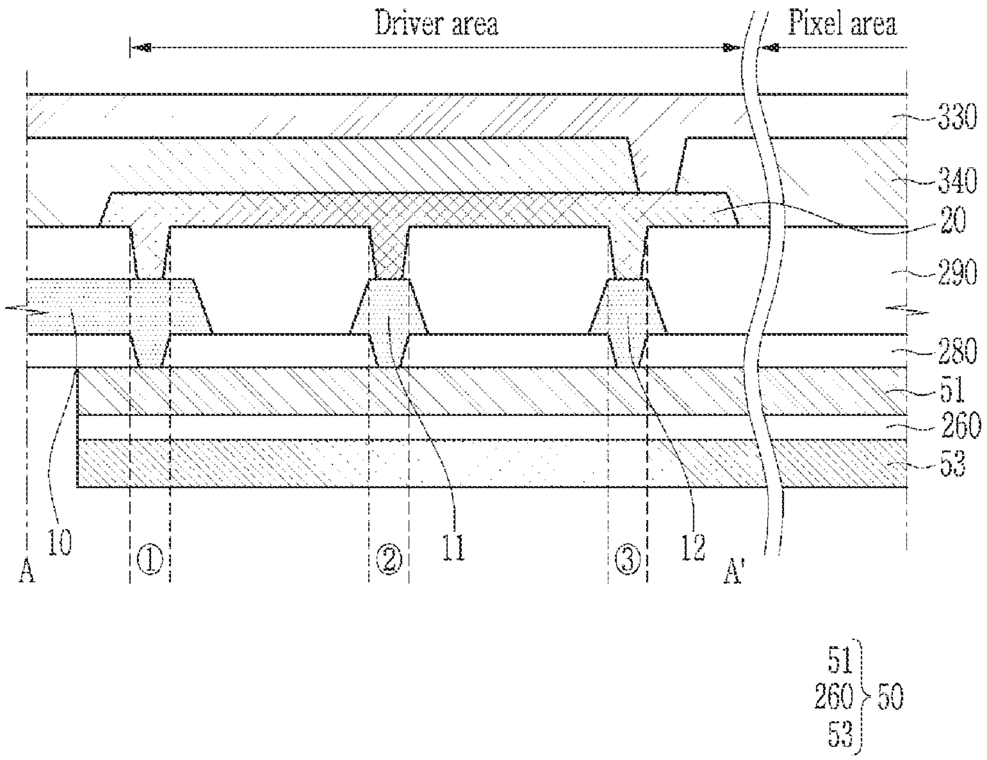
FIG. 6 is a view for explaining an example of a partial cross-section taken along a line AA' in FIG. 2 in a display device according to some embodiments.

FIG. 6 is a view for explaining an example of a partial cross-section taken along a line AA' in FIG. 2 in a display device according to some embodiments.

Referring to FIG. 6, in the cross-section, the display device 2 may include a reference voltage line 10, reference voltage auxiliary lines 11 and 12, a conductive line 20, and a metal line 50 for providing the reference voltage ELVSS, and the metal line 50 may be formed of dual metal lines 51 and 53 including a first metal line 51, a second metal line 53, and a first interlayer insulating layer 260 formed between the first metal line 51 and the second metal line 53. The reference voltage auxiliary lines 11 and 12 are formed to be separated from the reference voltage line 10 and may provide the reference voltage ELVSS, the conductive line 20 may form the contact for the upper surfaces of the reference voltage line 10 and the reference voltage auxiliary lines 11 and 12 to provide the reference voltage ELVSS to the cathode, and the dual metal lines 51 and 53 may electrically connect the reference voltage line 10 and the reference voltage auxiliary lines 11 and 12.

That is, in the embodiments described with respect to FIG. 6, the reference voltage ELVSS is electrically connected to the cathode 330 formed on the pixel definition layer 340, the conductive line 20 and the cathode 330 are electrically connected in the driver area, and the reference voltage ELVSS may be finally transmitted to the cathode 330. In the embodiments described with respect to FIG. 6, unlike FIG. 3 and FIG. 4, additional metal lines 51 and 53 may be further included.

According to some embodiments, in the area represented by ① at least a part of the upper surface of the reference voltage line 10 and the conductive line 20 may form the contact and at least a part of the lower surface of the reference voltage line 10 and the first metal line 51 of the dual metal lines 51 and 53 may form the contact, in the area represented by ② the upper surface of the reference voltage auxiliary line 11 (first ELVSS Bus wiring) and the conductive line 20 may form the contact and the lower surface of the reference voltage auxiliary line 11 (first ELVSS Bus wiring) and the first metal line 51 of the dual metal lines 51 and 53 may form the contact, and in the area represented by ③ the upper surface of the reference voltage auxiliary line 12 (second ELVSS Bus wiring) and the conductive line 20 may form the contact and the lower surface of the reference voltage auxiliary line 12 (second ELVSS Bus wiring) and the first metal line 51 of the dual metal lines 51 and 53 may form the contact. The dual metal lines 51 and 53 may be electrically connected to each other through a the contact hole, respectively, according to some embodiments.

According to some embodiments, as the conductive line 20 forms the contact for the upper surface of the reference voltage auxiliary lines 11 and 12 in addition to the reference voltage line 10, an effect of increasing the area of the contact formed between the reference voltage line 10 and the conductive line 20 may occur, and accordingly, the luminance difference due to the voltage drop may be improved.

Also, as the reference voltage auxiliary lines 11 and 12 are formed to overlap the driver area or the pixel area to provide the reference voltage ELVSS in the pixel area, the resistance may be reduced and the space where the reference voltage ELVSS is formed may be enlarged.

That is, as the dual metal lines 51 and 53 are electrically connected to the reference voltage line 10 and the reference voltage auxiliary lines 11 and 12, the effect of lowering the resistance occurs, thereby reducing the luminance difference due to the voltage drop.

Figure 7:
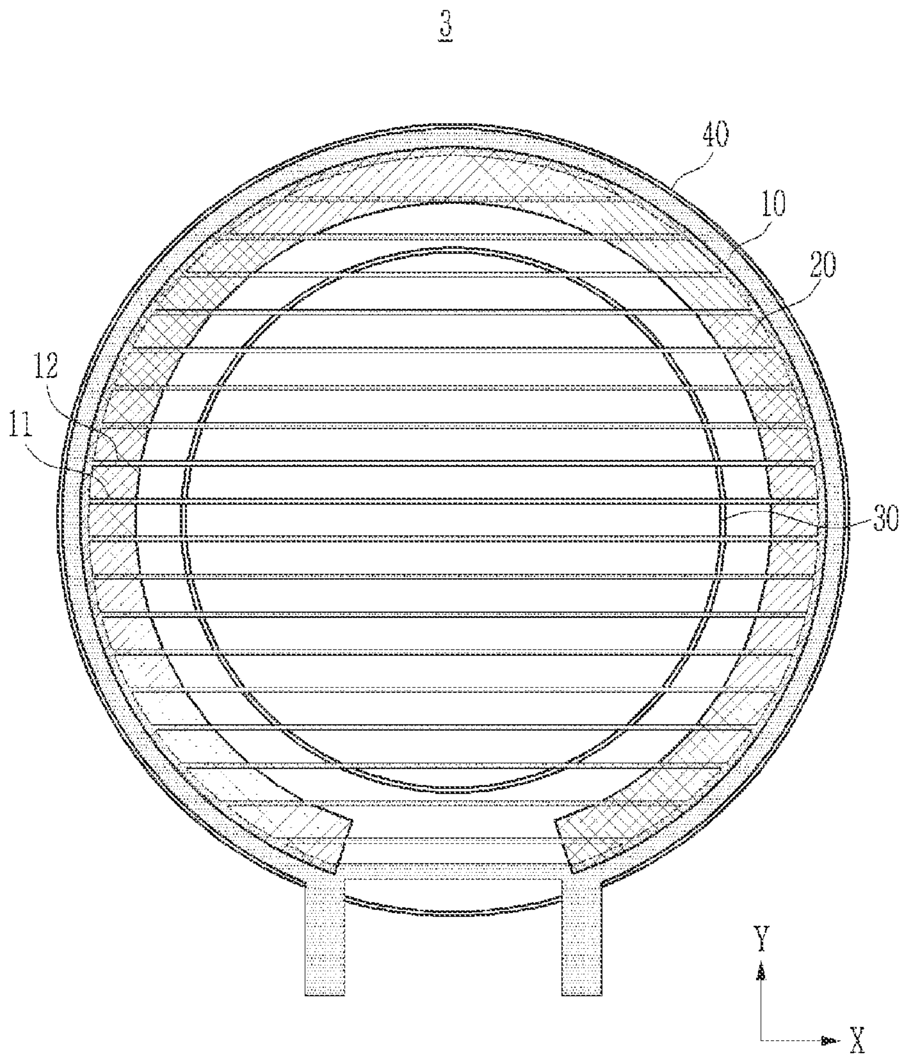
FIG. 7 is a view for explaining a circular display device according to some embodiments of the present invention.

FIG. 7 is a view for explaining a circular display device according to some embodiments of the present invention.

Referring to FIG. 7, a circular display device 3 according to some embodiments of the present invention may include a reference voltage line 10, reference voltage auxiliary lines 11 and 12, a conductive line 20 for forming the contact with the reference voltage line 10 and the reference voltage auxiliary lines 11 and 12, and an active line 30.

According to some embodiments, the reference voltage auxiliary lines 11 and 12 may be extended in the first direction (the X-axis direction). Each of the reference voltage auxiliary lines 11 and 12 may be formed in plural. The reference voltage auxiliary lines 11 and 12 may be formed in plural, a plurality of reference voltage auxiliary lines 11 and 12 may be formed to be parallel in a second direction (the Y-axis direction) with an interval (e.g., a set or predetermined interval). In this case, the intervals between a plurality of reference voltage auxiliary lines 11 and 12 may all be designed to be the same, and differently, at least some interval may be designed to have a difference from some other intervals.

The conductive line 20 may form the contact with the reference voltage auxiliary lines 11 and 12. That is, the conductive line 20 provides the reference voltage ELVSS to the cathode by forming the contact with the reference voltage line 10 and reference voltage auxiliary lines 11 and 12. Accordingly, an effect of increasing the area of the contact formed between the reference voltage line 10 and the conductive line 20 may occur, and accordingly, the luminance difference due to the voltage drop may be improved.

On the other hand, the reference voltage auxiliary lines 11 and 12 are formed on the driver area and the pixel area of the panel and are electrically connected to the elements formed in the driver area and the pixel area, thereby enlarging the space for the reference voltage ELVSS on the driver area and the pixel area.

Of course, unlike the embodiments described with respect to FIG. 1, FIG. 2, and FIG. 7, the reference voltage auxiliary lines 11 and 12 may be formed to be inclined with an acute angle. That is, the reference voltage auxiliary lines 11 and 12 may be formed to extend in the first direction forming an acute angle based on the X-axis. The reference voltage auxiliary lines 11 and 12 may be formed in plural, and a plurality of reference voltage auxiliary lines 11 and 12 may be formed to be respectively parallel with an interval (e.g., a set or predetermined interval) in a second direction forming an acute angle with respect to the Y-axis.

Figure 8:
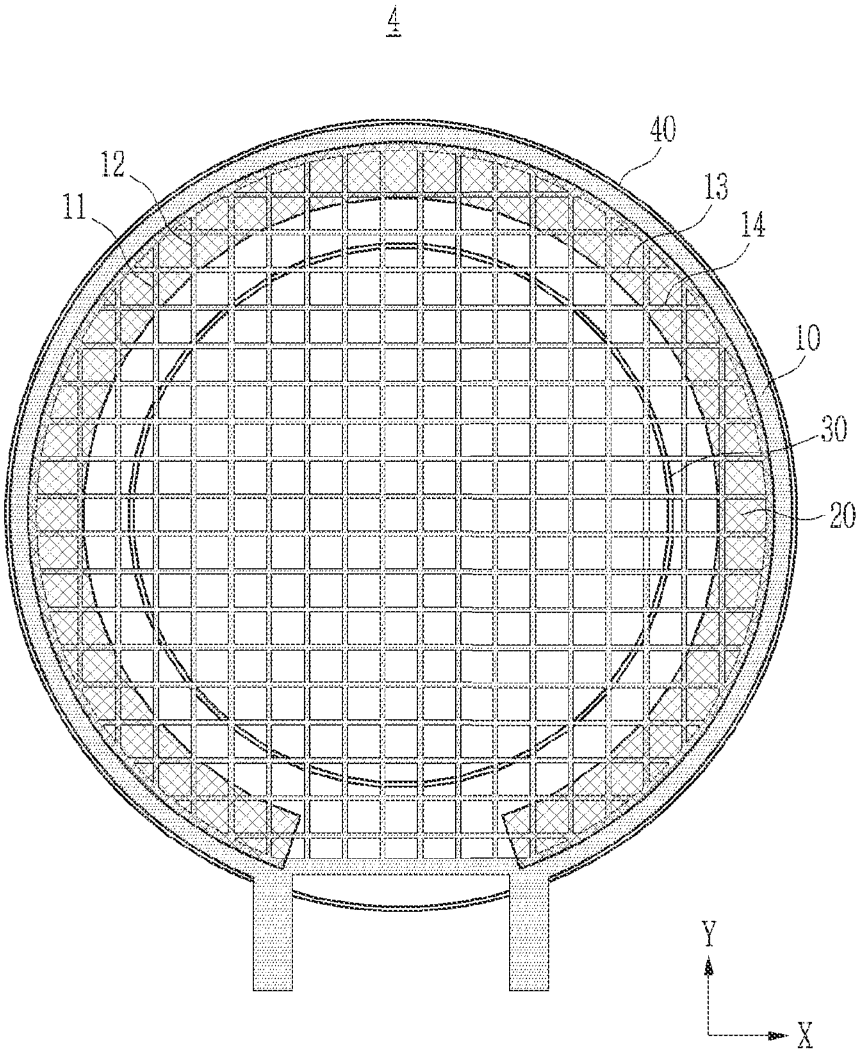
FIG. 8 is a view for explaining a circular display device according to some embodiments of the present invention.

FIG. 8 is a view for explaining a circular display device according to some embodiments of the present invention.

Referring to FIG. 8, the circular display device 4 according to some embodiments of the present invention may include a reference voltage line 10, reference voltage auxiliary lines 11, 12, 13, and 14, a conductive line 20 for forming the contact with the reference voltage line 10, and the reference voltage auxiliary lines 11 and 12 and the active line 30.

According to some embodiments, the reference voltage auxiliary lines 11, 12, 13, and 14 may be formed to have a mesh structure.

For example, the reference voltage auxiliary lines 11 and 12 may be formed to extend in the first direction (the Y-axis direction). The reference voltage auxiliary lines 11 and 12 may be formed in plural, and a plurality of reference voltage auxiliary lines 11 and 12 may be respectively formed to be parallel in a second direction (the X-axis direction) with an interval (e.g., a set or predetermined interval).

Meanwhile, the reference voltage auxiliary lines 13 and 14 may be formed to extend in the second direction (the X-axis direction). The reference voltage auxiliary lines 13 and 14 may be formed in plural and a plurality of reference voltage auxiliary lines 13 and 14 may be respectively formed in parallel in a first direction (the Y-axis direction) with an interval (e.g., a set or predetermined interval). The reference voltage auxiliary lines 13 and 14 may be formed to be electrically connected to the reference voltage line 10 and the reference voltage auxiliary lines 11 and 12.

In this way, as the reference voltage auxiliary lines 11 and 12 and the reference voltage auxiliary lines 13 and 14 are formed to cross each other, a mesh structure may be formed. Further, the conductive line 20 may form the contact with the reference voltage line 10 and the reference voltage auxiliary lines 11 and 12 or the reference voltage auxiliary lines 13 and 14 to provide the reference voltage (ELVSS) to the cathode.

In this case, the intervals between a plurality of reference voltage auxiliary lines 11, 12, 13, and 14 may all be designed to be the same, or differently, at least some interval may be designed to be different from some other intervals.

Figure 9:
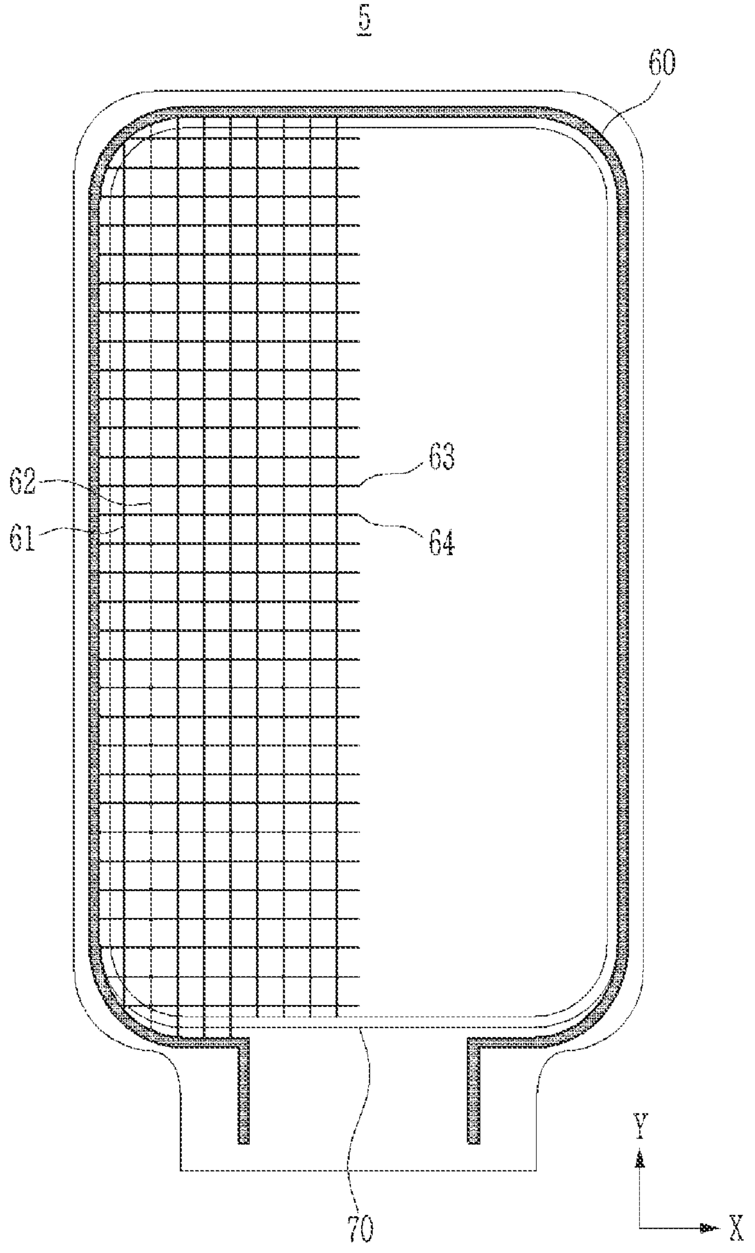
FIG. 9 is a view for explaining a display device according to some embodiments of the present invention.

FIG. 9 is a view for explaining a display device according to some embodiments of the present invention.

Referring to FIG. 9, the display device 5 according to some embodiments of the present invention may include a conductive line 70 and a reference voltage line 60 that is formed along the conductive line 70 to provide the reference voltage ELVSS. The conductive line 70 forms the electrical connection between the reference voltage line 60 and the cathode of the pixel, thereby providing the reference voltage ELVSS of the reference voltage line 60 to the cathode.

Also, in FIG. 9, the display area where a plurality of pixels are located may be formed within the conductive line 70, and the non-display area may be positioned outside the conductive line 70. In the embodiments described with respect to FIG. 9, the reference voltage line 60 is positioned in the non-display area.

The display device 5 may include a touch panel and a display panel, and the touch panel and the display panel may be formed separately, or may be integrally formed in an on-cell or in-cell method.

The display device 5 may include reference voltage auxiliary lines 61 and 62 electrically connected to the reference voltage line 60, extending in the first direction (the Y-axis direction), and formed to be parallel with an interval (e.g., a set or predetermined interval) in the second direction (the X-axis direction) perpendicular to the first direction (the Y-axis direction). Also, the display device 5 may include reference voltage auxiliary lines 63 and 64 electrically connected to the reference voltage line 60, extending in the second direction (the X-axis direction) and formed to be parallel in the first direction (the Y-axis direction) perpendicular to the second direction (X-axis direction) with an interval (e.g., a set or predetermined interval). Also, the reference voltage auxiliary lines 63 and 64 may also be electrically connected to the reference voltage auxiliary lines 61 and 62. That is, the reference voltage auxiliary lines 61, 62, 63, 64, may be formed to have a mesh structure.

The display device 5 may further include the conductive line 20, and the conductive line 20 may form the contact with the reference voltage line 60 and the reference voltage auxiliary lines 61 and 62 or the reference voltage auxiliary lines 63 and 64 to provide the reference voltage ELVSS to the cathode. An effect of increasing the area of the contact formed between the reference voltage line 60 and the conductive line 20 may thereby occur, and accordingly, the luminance difference due to the voltage drop may be improved. The details of the conductive line 20 described in connection with FIG. 1 to FIG. 8 may also be applied to the embodiments described with respect to FIG. 9.

On the other hand, the reference voltage auxiliary lines 61, 62, 63, and 64 are formed on the driver area and the pixel area of the panel and form the electrical connection with the elements formed in the driver area and the pixel area, thereby enlarging the space of the reference voltage ELVSS on the driver area and the pixel area.

The display device 5 may further include a metal line 50, and the metal line 50 may electrically connect the reference voltage line 60 and the reference voltage auxiliary lines 61 and 62 or the reference voltage auxiliary lines 63 and 64.

In addition, as the metal line 50 electrically connects the reference voltage line 60 and the reference voltage auxiliary lines 61, 62, 63, and 64, the effect of lowering the resistance occurs, thereby reducing the luminance difference due to the voltage drop. The details of the metal line 50 described in connection with FIG. 1 to FIG. 8 may also be applied to the embodiments described with respect to FIG. 9.

According to the embodiments of the present invention described so far, by forming the reference voltage auxiliary lines 11 to 14 and 61 to 64, the luminance difference due to the voltage drop may be improved by increasing the area of the contact formed between the reference voltage lines 10 and 60 providing the reference voltage ELVSS and the conductive line 20 providing the reference voltage ELVSS to the cathode.

In addition, by lowering the resistance through the metal line 50 electrically connecting the reference voltage lines 10 and 60 and the reference voltage auxiliary line 20, the luminance difference due to the voltage drop may be improved. Furthermore, by forming the reference voltage auxiliary lines 11 to 14 and 61 to 64, the space of the reference voltage ELVSS on the driver area and pixel area of the panel be expanded.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

DESCRIPTION OF SOME OF THE REFERENCE SYMBOLS

1, 2, 3, 4, 5: display device 10, 60: reference voltage line
11, 12, 13, 14, 61, 62, 63, 64: reference voltage auxiliary line
20: conductive line 30: active line
40, 70: outer line

What is claimed is:

1. A display device comprising:
a reference voltage line formed along a circular outer line and configured to provide a reference voltage;
a first reference voltage auxiliary line electrically connected to the reference voltage line and formed to be parallel with a predetermined interval;
a conductive line forming a contact with the reference voltage line and the first reference voltage auxiliary line and configured to provide the reference voltage to a cathode;
a second reference voltage auxiliary line electrically connected to the reference voltage line and the first reference voltage auxiliary line, extending in a second direction, and formed to be parallel in a first direction with a predetermined interval.

2. The display device of claim 1, wherein the first direction is a Y-axis direction, and the second direction is an X-axis direction.

3. The display device of claim 1, wherein the first direction is an X-axis direction, the second direction is a Y-axis direction.

4. The display device of claim 1, wherein the conductive line forms the contact with the reference voltage line and the first reference voltage auxiliary line or the second reference voltage auxiliary line to provide the reference voltage to the cathode.

5. The display device of claim 1, wherein the first direction is a direction forming an acute angle based on an X-axis and the second direction is a direction forming an acute angle based on a Y-axis.

6. The display device of claim 1, further comprising a metal line electrically connecting the reference voltage line and the first reference voltage auxiliary line.

7. The display device of claim 6, wherein the metal line includes a first metal line, a second metal line and an insulated line between the first metal line and the second metal line.

8. The display device of claim 1, wherein the first reference voltage auxiliary line is formed to overlap a driver area or a pixel area.

9. The display device of claim 8, wherein at least a part of the first reference voltage auxiliary line is configured to provide the reference voltage to the pixel area.

10. A display device comprising:
a display area and a non-display area,
wherein the non-display area includes:
a reference voltage line extending along a perimeter of the display area in a plan view and configured to provide a reference voltage;
a first reference voltage auxiliary line and a second reference voltage auxiliary line formed to be separated from the reference voltage line and in the non-display area to provide the reference voltage; and
a conductive line forming a contact for upper surfaces of the reference voltage line, the first reference voltage auxiliary line, and the second reference voltage auxiliary line to provide the reference voltage to a cathode.

11. The display device of claim 10, wherein the first reference voltage auxiliary line is formed to overlap a driver area or a pixel area.

12. The display device of claim 11, wherein at least a part of the first reference voltage auxiliary line is configured to provide the reference voltage to the pixel area.

13. The display device of claim 10, further comprising a metal line forming the contact for lower surfaces of the reference voltage line and the first reference voltage auxiliary line.

14. The display device of claim 13, wherein the metal line includes a first metal line, a second metal line, and an insulating line between the first metal line, the second metal line.

15. The display device of claim 10, wherein the reference voltage line is formed circularly along a circular outer line.

16. The display device of claim 10, wherein the reference voltage line has quadrangular shape.

* * * * *